US007512090B2

(12) United States Patent  
Benitez Pelaez et al.

(10) Patent No.: US 7,512,090 B2
(45) Date of Patent: Mar. 31, 2009

(54) SYSTEM AND METHOD FOR ROUTING CALLS IN A WIRELESS NETWORK USING A SINGLE POINT OF CONTACT

(75) Inventors: Mariana Benitez Pelaez, Naperville, IL (US); Kamal K. Verma, Naperville, IL (US); Charu Verma, Darien, IL (US); Victoria M. Halsell, Bolingbrook, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 904 days.

(21) Appl. No.: 10/827,039

(22) Filed: Apr. 19, 2004

(65) Prior Publication Data

US 2005/0232225 A1    Oct. 20, 2005

(51) Int. Cl.
*H04Q 7/00* (2006.01)
*H04L 12/28* (2006.01)

(52) U.S. Cl. .................. 370/328; 370/351; 370/352; 709/227

(58) Field of Classification Search ............... None
See application file for complete search history.

(56) References Cited

U.S. PATENT DOCUMENTS 5,742,668 A * 4/1998 Pepe et al. .................. 455/415
6,778,661 B1 * 8/2004 Yumoto et al. ........... 379/265.09
7,299,286 B2 * 11/2007 Ramsayer et al. .......... 709/228
7,336,603 B2 * 2/2008 Sugiyama et al. .......... 370/230
2003/0076816 A1 * 4/2003 Naranjo et al. ............. 370/352
2003/0099220 A1 * 5/2003 Jeon ........................... 370/338
2003/0161333 A1 * 8/2003 Schain et al. ............... 370/401
2004/0053616 A1 * 3/2004 Overtoom et al. .......... 455/445
2004/0057569 A1 * 3/2004 Busey et al. ........... 379/265.09
2005/0223097 A1 * 10/2005 Ramsayer et al. .......... 709/227
2006/0120351 A1 * 6/2006 Rajagopalan ............... 370/352

* cited by examiner

*Primary Examiner*—Wing F Chan
*Assistant Examiner*—Robert C Scheibel

(57) ABSTRACT

A system and method of routing calls made to a called party Subscriber Universal Destination Identifier (SUDI) in a wireless communications network is provided. The method includes determining the call type, selecting a call-type-specific destination identifier for the call from a plurality of called party destination identifiers based on the call type, and routing the call to the called party using the selected call-type-specific destination identifier. The step of determining the call type can include determining the call protocol, determining the media type, and determining the call type from the call protocol and the media type. The system includes functionality for determining the call type, selecting a call-type-specific destination identifier for the call from a plurality of called party destination identifiers based on the call type, and routing the call to the called party using the selected call-type-specific destination identifier.

17 Claims, 3 Drawing Sheets

SYSTEM AND METHOD FOR ROUTING CALLS IN A WIRELESS NETWORK USING A SINGLE POINT OF CONTACT

BACKGROUND OF THE INVENTION

This invention relates to the art of telecommunications and more particularly to a system and method for routing a call in a wireless communications network made to a called party universal destination identifier.

Wireless communications networks, also known as cellular networks, have been widely adopted around the world. These telecommunications systems can do more than transfer voice calls. A wide variety of different calls transferring a wide variety of different types of media can now be made over a wireless communications network.

A user, also known as a subscriber, can have a wide variety of devices on which they wish to receive calls. Currently, each device can only be reached by the calling party using the corresponding destination identifier for that device. A calling party placing a call to the subscriber, also referred to as the called party, will have to keep track of the plurality of different "numbers" for reaching the appropriate called party device.

It is desirable to provide a called party with a single point of contact whereby the called party can receive different call types at different destinations, each destination corresponding to a specific device intended for receiving that particular call type.

SUMMARY OF THE INVENTION

A system and method of routing calls in a wireless communications network using a single point of contact is provided.

In accordance with a first aspect of the invention, the method includes determining the call type, selecting a call-type-specific destination identifier for the call from a plurality of called party destination identifiers based on the call type, and routing the call to the called party using the selected call-type-specific destination identifier.

In accordance with a second aspect of the invention, the step of determining the call type can include determining the call protocol, determining the media type, and determining the call type from the call protocol and the media type.

In accordance with another aspect of the invention, the system includes means for determining the call type, means for selecting a call-type-specific destination identifier for the call from a plurality of called party destination identifiers based on the call type, and means for routing the call to the called party using the selected call-type-specific destination identifier.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The invention may take form in various components and arrangements of components, and in various steps and arrangements of steps. The drawings are only for purposes of illustrating preferred embodiments and are not to be construed as limiting the invention. Further, it is to be appreciated that the drawings are not to scale.

DETAILED DESCRIPTION OF THE INVENTION

Figure 1:
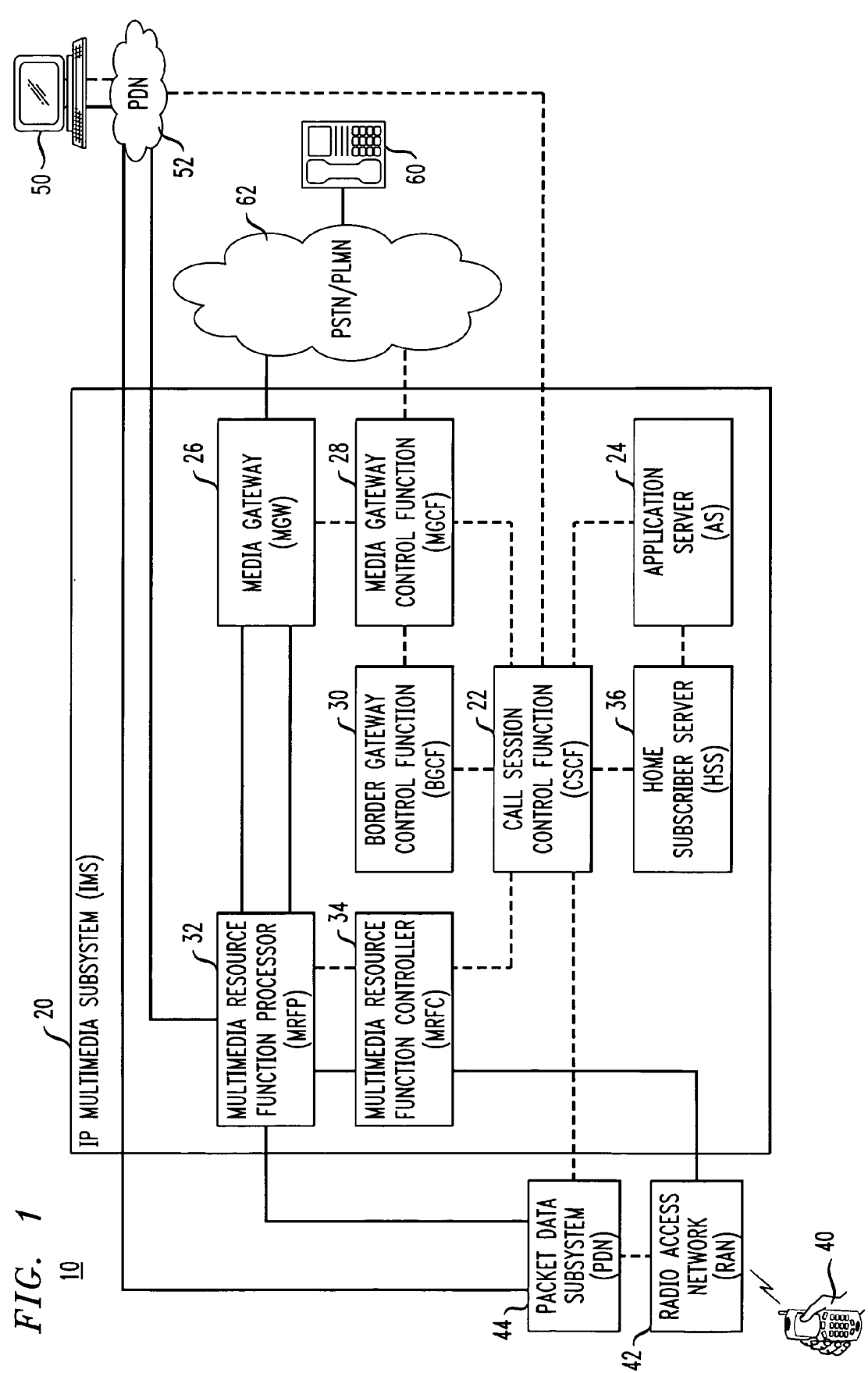
FIG. 1 is a diagrammatic illustration showing an exemplary telecommunications environment suitable for practicing aspects of the present invention.

For simplicity and ease of reference, the following acronyms shall be used in the present specification to refer to structural and/or functional network elements and/or entities, relevant telecommunications standards, protocols and/or services, terminology, etc., as they are commonly known in the telecommunications art, except to the extent they have been modified in accordance with aspects of the present invention:

3G—$3^{rd}$ Generation
3GPP—$3^{rd}$ Generation Partnership Project
3GPP2—$3^{rd}$ Generation Partnership Project 2
AAA—Authentication/Authorization/Accounting
AH—Address Handling
AS—Application Server
BGCF—Border Gateway Control Function
CCF—Call Control Function
CDMA—Code Division Multiple Access
CSCF—Call Session Control Function
HLR—Home Location Register
HSS—Home Subscriber Server
ICGW—Incoming Call Gateway
IMS—IP Multimedia Subsystem
IP—Internet Protocol
MGCF—Media Gateway Control Function
MGW—Media Gateway
MMT—Multimedia Terminal
MRFC—Multimedia Resource Function Controller
MRFP—Multimedia Resource Function Processor
PDN—Public Data Network
PLMN—Public Land Mobile Network
PSDN—Packet Switched Data Network
PSTN—Public Switched Telephone Network
PTT—Push-to-Talk
RAN—Radio Access Network
SIP—Session Initiation Protocol
SMS—Short Message Service
SMT—Single Media Terminal
SPD—Serving Profile Database
UMTS—Universal Mobile Telecommunications System
VOIP—Voice over IP
WLAN—Wireless Local Area Network With reference to FIG. 1, an optionally 3GPP/3GPP2 compliant telecommunications environment or network 10 is equipped and/or arranged to manage and/or route multimedia communications between terminals employing the same. Other suitable telecommunications environments, however, may be employed. The network 10 includes an IMS 20 that incorporates in the usual manner a number of network entities and/or elements, namely, one or more of a CSCF 22, AS 24, MGW 26, MGCF 28, BGCF 30, MRFP 32, MRFC 34, HSS 36. As is known in the art, the IMS 20 manages call sessions and provides and administers packet switching for multimedia communications within the network 10.

For exemplary purposes, an MMT 40 also referred to as the calling party terminal or calling party, is shown as a mobile MMT (namely, a multimedia enabled mobile phone as is commonly known) that is operatively connected to the IMS 20 via a RAN 42. The RAN 42, as it is known, is that portion of a mobile network that handles subscriber access, including radio base stations and control and concentration nodes, i.e., the portion relating to "over the air" communications between the mobile terminal and the network base station. A packet data subsystem 44 interfaces the RAN 42 with the IMS 20 and PDN 52 in the usual manner.

Another MMT 50, referred to a the called party terminal is shown as a laptop or notebook type computer operatively connected to the IMS 20 via a PDN 52. The MMT 50 optionally employs a WLAN or wire line, in the usual manner, to operatively connect to the PDN.

An SMT 60, also referred to as the called party terminal is shown as an ordinary telephone equipped to handle only voice communications. The SMT 60 is operatively connected to the IMS 20 via a PSTN/PLMN 62.

Only a first 50 and second 60 called party terminal are shown in FIG. 1 for the purpose of simplicity herein. However, it is to be appreciated that typically a plurality of called party terminals are similarly situated. Additionally, while depicted as a specific type of MMT or SMT, other suitable terminals capable of communicating over the wireless communications network 10 are also contemplated.

With continuing reference to FIG. 1, the bearer paths, as are known in the art, that carry and/or relay the communication traffic and/or user information intended to be transmitted from one terminal to another are shown as solid lines. Control paths, as are known in the art, carry and/or relay associated signaling and/or control commands or messages to and between appropriate network elements and/or entities such that call sessions are properly managed-and routed. The control paths are shown as dashed lines in FIG. 1. Suitably, SIP and/or other appropriate known protocols are used on the control and bearer paths, respectively, e.g., the known H.248 protocol is suitably employed for media gateway controls. The CSCF 22, BGCF 30, MGCF 28, MRFC 34 and AS 24 comprise the call control and signaling functionality for the IMS 20, while the bearer paths interface with the MRFP 32 and MGW 26 to provide and support interconnectivity to external networks and/or subsystems, such as, the packet data subsystem 44, PDN 52 and PSTN/PLMN 62.

The CSCF 22 supports and controls multimedia sessions. The CSCF 22 invites the MGCF 28 and/or MRFC 34 to call sessions to control the establishment and maintenance of bearer paths for call sessions, e.g., by adding, modifying or deleting appropriate bearer paths for respective call sessions. The CSCF 22 is the signaling entity for call session control. It manages sessions (e.g., using SIP and/or other appropriate call/session establishment protocols), provides features and services and coordinates with other network elements for session control, service control and resource allocation. The CSCF 22 performs several functions including Incoming Call Gateway (ICGW) in which it acts as a call session entry point and routes incoming calls to the called party destination.

The CSCF 22 also performs Call Control Function (CCF) in which it executes call setup/termination and state/event management. It interacts with the MGCF 28 for calls to/from the PSTN/PLMN 62, and with the BGCF 30 for calls to the PSTN/PLMN 62 to determine the appropriate MGCF 28 to use. It also controls the MRFP 32 via the MRFC 34 (which interprets information or signals coming from the CSCF 22 and controls the MFRP 32 accordingly) in order to support conferencing and other multi-party services. SIP level registrations from subscribers are processed in CCF. The CCF may provide service trigger mechanisms to the AS 24 to invoke services provided thereby (either locally, at the AS 24, or elsewhere). It also reports call events for billing, auditing, intercept or other purposes, and may query the AS function to check whether a requested communication is allowed given the current subscription.

The CSCF 22 also provides a Serving Profile Database (SPD) in which it interacts with the HSS/AAA 36 to receive and cache user profile information.

The CSCF 22 also performs Address Handling (AH) in which it performs address analysis, translation, modification (when appropriate) and mapping.

The MGW 26 acts as a bearer path interface between the IMS 20 and externals networks and/or subsystems, and provides translation resources and resources for modifying the bearer stream (e.g., encoding, transcoding, compression, packetization, depacketization, etc.). It interacts with the MGCF 28 (which interprets signaling coming from the CSCF 22 and controls the MGW 26 accordingly) in order to achieve resource allocation, bearer path control, and payload processing. The MGCF 28 communicates with the CSCF 22 in order to control the call state for media channels on one or more MGWs and performs conversions between legacy and 3G UMTS/CDMA network call control protocols. Similarly, the MRFC 34 controls the media stream resources in the MRFP 32 which also acts as a bearer path interface between the IMS 20 and external networks and/or subsystems, however, being able to provide for conferencing or multiple party communications or other more advanced media services (relative to the MGW 26).

The HSS 36 maintains subscriber and system related data, user profiles, locations, etc. Optionally, the HSS 36 also contains what is known as the HLR functionality and/or AAA function. Suitably, the HSS database can include: user identification, via numbering and addressing information; user security information, including network access control information for authentication and authorization; user location information for user registration and locating; and a user profile, including identification of the services subscribed to and other service specific information. The HSS 36 also includes one or more call-type-specific destination identifiers associated with a called party by a single point of contact as described below.

Figure 2:
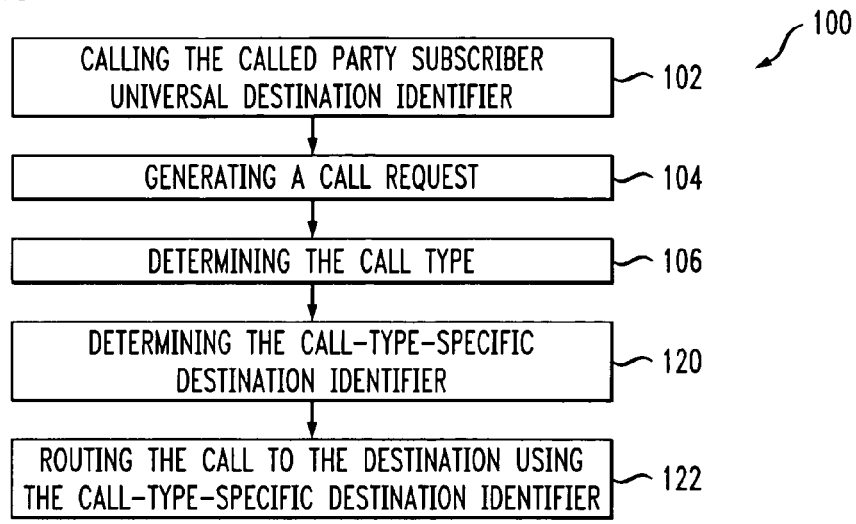
FIG. 2 is a flow chart illustrating a method routing a call made to a single point of contact in accordance with the invention.
Figure 3:
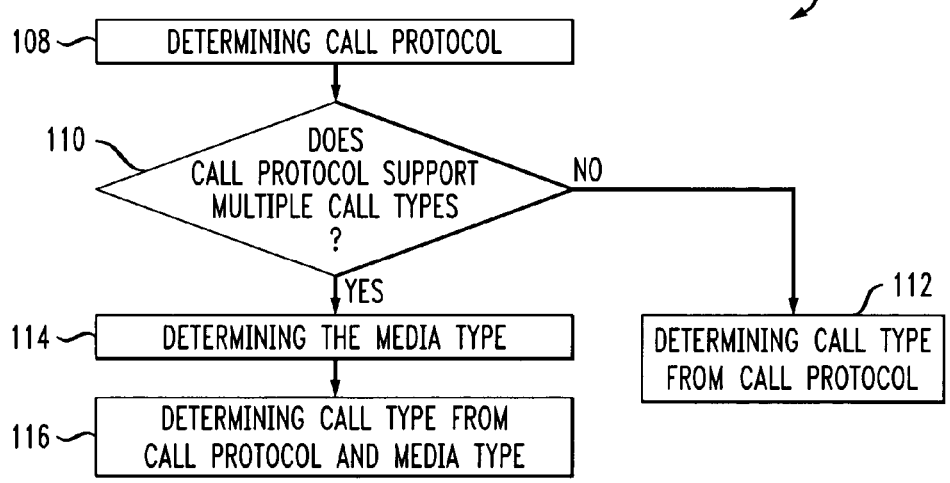
FIG. 3 is a flow chart illustrating a method determining the call type in accordance with the invention.

Referring now to FIGS. 2 and 3, a method of routing a call in a wireless communications network using a single point of contact, also referred to as a Subscriber Universal Destination Identifier (SUDI), is shown generally at 100. The method 100 includes calling a called party SUDI at 102. The SUDI can be a phone number or a Uniform Resource Identifier (URI). A URI can be used to identify points of content, such as a page of text, a video or sound clip, a still or animated image, or a program. Examples of a URI can include, but are not limited to, a Uniform Resource Locator (URL) such as an Internet Protocol (IP) address, a Uniform Resource Name (URN), a Session Initiation Protocol (SIP) address, or an E164 number.

A URI can describe the mechanism used to access the resource at the destination, such as the specific computer that the resource is housed in at that destination, and the specific name of the resource, such as for example a file name on the computer. As an example, a URI may be: http://www.w3.org/Icons/WWW/w3c_main.gif. This URI identifies a file that can be accessed using the Web protocol application, Hypertext Transfer Protocol, ("http://") that is housed on a computer named "www.w3.org" (which can be mapped to a unique Internet address). In the computer's directory structure, the file is located at the pathname of "/Icons/WWW/w3c_main.gif." Character strings that identify File Transfer Protocol FTP addresses and e-mail addresses are also URLs and thus are URIs. A URN is a form of URI that has "institutional persistence," such that its exact destination may change from time to time, but an agency accessed by the URN will be able to find it.

A wireless subscriber can use a single SUDI to receive plurality of different call types over the wireless communications network 10. Examples of the call types can include, but are not limited to, voice calls, a data session for transferring data over the wireless communications network, and SMS text messages, video sessions, or a combination of these which can be referred to as multimedia sessions. The single SUDI can be used to route calls of different call types to different destinations indicated by corresponding call-type-specific destination identifiers. Examples of these destinations can include, but are not limited to a wireless communications terminal or a wireline terminal for voice calls, a computer or a multimedia wireless terminal for data transmissions. The called party can specify the different destinations for different call types using call-type-specific destination identifiers. More than one call type can be sent to a destination identified by a call-type-specific destination identifier.

Calling the called party SUDI at 102 generates one or more call control commands, referred to generally as a "call request", at 104. As shown by way of example in FIG. 4, the call request 202 is sent to the CSCF 22. The call request 202 can be made using any suitable call control command or commands using any suitable protocol. The call request 202 typically includes a session ID, an indicator of the Originating Host (the calling party), and an indicator of the Destination Host (as identified by the SUDI). The call request 202 can include a media descriptor as described below.

The method 100 also includes determining the call type at 106. The CSCF 22 can determine the call type at 106 from the call request 202. Referring to FIG. 3, the step of determining the call type at 106 is shown in further detail. The CSCF 22 determines the call protocol used in the call control signaling of the call request at 108. If the call protocol does not support multiple call types at 110, the call type is determined from the protocol used for the call request at 112. In an example, which should not be considered limiting, if the call request is made using ISUP signaling which supports only voice calls then the CSCF 22 determines that the call type is an ISUP voice call from the call protocol at 112.

If the call protocol used for the call request does support multiple call types at 110, the method 100 also includes determining the media type at 114. The media type is the type of media that will be transferred by the call, examples of which can include, but are not limited to "audio", "video", "application", "data" and "control", among others. The difference between "application" and "data" is that the former is a media flow such as whiteboard information, and the latter is bulk-data transfer such as multicasting of program executables which will not typically be displayed to the user. "Control" is used to specify an additional conference control channel for the session." The media type can be determined from the media descriptor included in the call request 202. The media descriptor can be any indicator of the media type to be transferred in the call that is included in the call request.

The CSCF 22 uses the call protocol and the media type to determine the call type at 116. In an example, which should not be limiting, the call request is made using SIP signaling call control protocol when the calling party calls the called party SUDI at 102. The SIP protocol can support more than one call type. Therefore, the CSCF 22 determines the media type to be transferred in the call from the media descriptor included in the call request at 114. In SIP, the media type is described within the Session Description Protocol (SDP) which is defined in IETF (Internet Engineering Task Force) RFC 2327. The SDP indicates the media type using a media descriptor media line, such as for example a line starting with 'm=' that indicates the media type. However, other conventions/protocols can be used and the media type can be determined from the media descriptor used therein.

The media may be transferred as a media payload type as defined in the RTP (Real-Time Transport Protocol) AudioNideo Profile. In this example, a subfield contains a payload type number which is used to identify a particular payload type format. There can be additional attribute lines to define details of the format, such as for example attribute lines commencing with 'a='. An example of the media type from the RFC2327 protocol, which should not be considered limiting, can include a static payload type u-law PCM coded single channel audio sampled at 8 KHz, as defined in the RTP AudioNideo profile as payload type 0. The media descriptor used to determine the media type for such a stream sent to UDP port 49232 is:

*m*=video 49232 RTP/AVP 0

The call type is determined to be an RTP call having the media type described above.

As another example, a dynamic payload type, such as for example 16 bit linear encoded stereo audio media sampled at 16 KHz, can include a media type as defined by a media descriptor using a dynamic RTP/AVP payload type 98 with:

*m*=video 49232 RTP/AVP 98; and

*a*=rtpmap:98 L16/16000/2

The call type is determined to be an RTP call having the media type described above.

Figure 4:
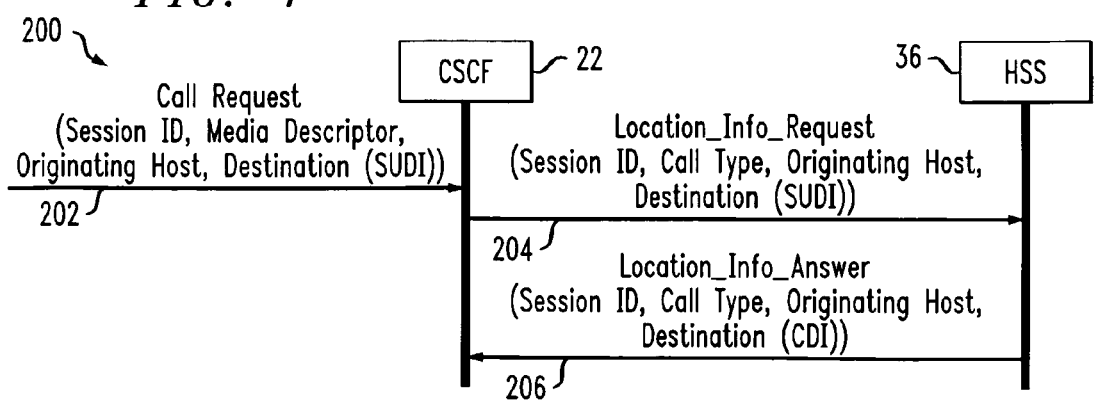
FIG. 4 is a message flow illustrating the system and method of routing a call in wireless communications network in accordance with the invention.

Referring now to FIGS. 2 and 4, the method 100 also includes determining a call-type-specific destination identifier (CDI) at 120. The CDI identifies the destination that the call having the call type as determined at 106 is routed to. The CDI can identify any destination suitable to the call type to which a call can be routed to over a wireless communications network 10. Examples can include, but are not limited to a phone number of a wireless communications terminal, the phone number of a wireline terminal, an IP address, etc.

The CDI can be determined by the CSCF 22, the HSS 36, or any other suitable network node in the wireless communications network 10. In the examples described herein, which should not be considered limiting, the CDI is determined by the HSS 36. After determining the call type at 106, the CSCF 22 sends a Location_Info_Request 204 to the HSS 36. The Location_Info_Request 204 includes the call type, the originating host and the SUDI. The HSS determines the CDI at 120 using the SUDI and the call type. For example, the CDI can be determined via a table lookup once the SUDI and call type are known. A plurality of CDIs can be provisioned at the HSS for a variety of call types, by the subscriber or by the network provider. The subscriber can provide the network 10 with a CDI for each corresponding call type. For example, all call types transferring data are to be sent to a destination identified by CDI #1 (e.g. IP address of computer), all ISUP voice calls are to be sent to a destination identified by CDI #2 (e.g. a wireline terminal phone number), for all SMS messages are to be sent to a destination identified by CDI #3 (e.g. a wireless terminal), etc.

The HSS 36 sends a Location_Info_Answer 206 back to the CSCF 22 which includes the CDI for the call type determined at step 106. The CSCF 22 then routes the call to the call-type-specific destination as identified by the CDI at 122.

Figure 5:
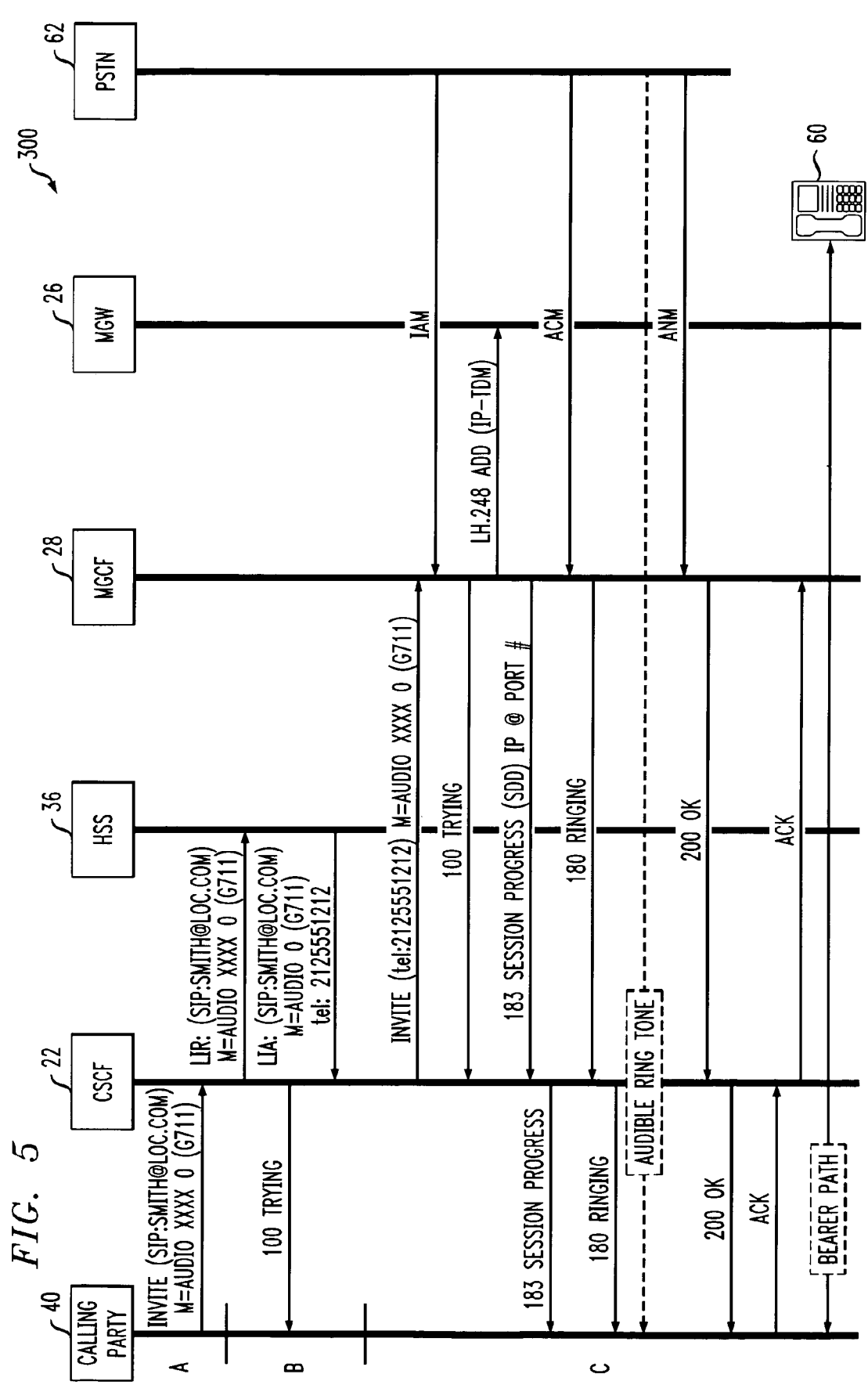
FIG. 5 is a message flow illustrating an example of the system and method of routing a call in wireless communications network in accordance with the invention.

Referring now to FIG. 5, a message flow illustrating another example is shown generally at 300. In this example, the calling party 40 places an audio call, that is a normal voice call, to the called party using a SIP SUDI=sip:anniebp@lucent.com.

As shown in part A of the message flow 300, the call request 202 is an INVITE message from the calling party terminal 40 to the CSCF 22. The call request (INVITE message) includes a media descriptor:

m=audio xxxx RTP/AVP 0.

The CSCF 22 uses the call request to determine that the call protocol is SIP. Further, since the SIP call protocol can support more than one call type by being able to transfer more than one media, the CSCF 22 determines the media type from the media descriptor as an 'audio' call on port number xxxx and the codec is 0 which stands for G711 mu-law. The CSCF 22 therefore determines the call type to be a SIP audio/G711 call.

In part B, The CSCF 22 makes the Location Info Request (LIR) query to the HSS 36 which includes the call type (SIP audio/G711) and the SUDI. The HSS 36 determines the CDI at 120 using the call type and SUDI and responds to the Location Info Request query by sending a Location Info Answer (LIA) back to the CSCF 22 which includes the CDI for that call type. In this example, the CDI is a telephone number, 212-555-1212, for a terminal where the called party wants to receive SIP audio/G711 calls.

In part C, the call is routed to the destination using the CDI in a known manner. The CSCF 22 sends an INVITE message to the appropriate MGCF 28 to route to the call to destination telephone number. The MGCF 28 in turn sends an IAM (initial address message) to the PSTN 62 to set up the call. H.248 messages are sent to the MGW 26 to set up the bearer interconnection from IP to TDM. 83 Session Progress and 180 Ringing messages are returned to the calling party 40 to indicate that the call is being set-up. Once the call is answered by the PSTN 62 an ANM (Answer Message) is returned to the MGCF 28, which in turn sends a 200OK SIP message to the CSCF 22 and then to the calling party 40. And ACK (Acknowledge message) is returned and the bearer path for the call is established and the call is routed to the destination/device indicated by the call-type-specific destination identifier.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A system for routing calls having different call types in a 3GPP/3GPP2 wireless communications network made to a called party single point of contact comprising:

an Internet Protocol Multimedia Subsystem (IMS) Call Session Control Function (CSCF) network entity receiving Subscriber Universal Destination Identifier (SUDI) call requests from a calling party multimedia enabled mobile phone via a radio area network, each SUDI call request corresponding to a different call made to a called party single point of contact, at least some of the SUDI call requests including a session identifier and a SUDI defining a single point of contact for calls having different call types made to a called party and a media descriptor defining the type of media to be transferred by the call and an indicator of the originating host, the OSOF network entity executing call setup and call session control for each call and determining a call type for each call from the corresponding SUDI call request including:

determining if a protocol for the SUDI call request can support multiple call types, wherein if the SUDI call request protocol cannot support multiple call types then determining the call type from the SUDI call request protocol, and wherein if the SUDI call request protocol can support multiple call types then determining the call type from the media descriptor in the SUDI call request;

means for determining a call type for each call; and means for selecting a call-type-specific destination identifier for each call from a plurality of called party destination identifiers based on the call type, wherein the CSCF network entity routes the calls to the called party using the selected call-type-specific destination identifiers.

2. The system defined in claim 1 wherein at least some of the SUDIs are Uniform Resource Identifiers and at least one of the SUDIs is a telephone number.

3. The system defined in claim 1 wherein a SUDI is a Uniform Resource Locator (URL).

4. The system defined in claim 1 wherein a SUDI is a Uniform Resource Name (URN).

5. The system defined in claim 1 wherein a SUDI is a telephone number.

6. A method of routing calls having different call types in a 3GPP/3GPP2 wireless communications network made to a called party single point of contact comprising:

receiving Subscriber Universal Destination Identifier (SUDI) call requests at an Internet Protocol Multimedia subsystem (IMS) Call Session Control Function (CSCF) network entity executing call setups and call sessions control from a calling party multimedia enabled mobile phone via a radio area network, each SUDI call request corresponding to a different call made to a called party single point of contact, at least some of the SUDI call requests including a session identifier and a SUDI defining a single point of contact for calls having different call types made to a called party and a media descriptor defining the type of media to be transferred by the call and an indicator of the originating host;

determining a call type for each call from the corresponding SUDI call request including:
    determining if a protocol for the SUDI call request can support multiple call types, wherein if the SUDI call request protocol cannot support multiple call types then determining the call type from the SUDI call request protocol, and wherein if the SUDI call request protocol can support multiple call types then determining the call type from the media descriptor in the SUDI call request;
selecting a call-type-specific destination identifier for each call from a plurality of called party destination identifiers based on the call type;
executing call setup for each call; and
routing each call to the called party using the selected call-type-specific destination identifier.

7. The method defined in claim 6 wherein at least some of the SUDIs are Uniform Resource Identifiers and at least one of the SUDIs is a telephone number.

8. The method defined in claim 6 further comprising:
the CSCF network entity sending a Location_Info_Request to an IMS Home Subscriber Server (HSS) maintaining subscriber user profiles and containing call-type-specific destination identifiers associated with the called party, the Location_Info_Request including the call type, the originating host and the SUDI; and
the CSCF network entity receiving a Location_Info_Answer from the HSS including the call-type-specific destination identifier for the call.

9. The method defined in claim 8 further comprising:
the called party providing a plurality of different call-type-specific destination identifiers for a plurality of different call types corresponding to the single point of contact for the called party for storage at the HSS.

10. The method defined in claim 8 wherein the HSS contains Home Location Register (HLR) functionality and user location information for user registration and locating.

11. The method defined in claim 6 wherein a SUDI call request is a SIP INVITE message.

12. The method defined in claim 11 further comprising:
the determining includes determining the call type for the SIP INVITE call request to be a SIP audio call; and
the selecting includes selecting a telephone number as the call-type-specific destination identifier.

13. The method defined in claim 12 wherein the determining includes determining the call type for the SIP INVITE call request to be a SIP audio G711 call.

14. The method defined in claim 6 wherein the SUDI is a Uniform Resource Identifier (URI).

15. The method defined in claim 6 wherein the SUDI is a Uniform Resource Locator (URL).

16. The method defined in claim 6 wherein the SUDI is a Uniform Resource Name (URN).

17. The method defined in claim 6 wherein the SUDI is a telephone number.

* * * * *